United States Patent [19]

Kaempen

[11] 4,385,644

[45] May 31, 1983

[54] COMPOSITE LAMINATE JOINT STRUCTURE AND METHOD AND APPARATUS FOR MAKING SAME

[75] Inventor: Charles E. Kaempen, Orange, Calif.

[73] Assignee: Plastonics International Inc., Ohio

[21] Appl. No.: 338,526

[22] Filed: Jan. 11, 1982

[51] Int. Cl.$^3$ .................. F16L 9/00; B65H 81/00; F16L 25/00; B32B 5/12

[52] U.S. Cl. ........................ 138/109; 138/130; 138/172; 138/174; 156/173; 156/175; 285/371; 285/373; 285/398; 285/419; 428/36; 428/109; 428/110; 428/113

[58] Field of Search ............... 428/109, 110, 113, 36; 138/130, 172, 174, 109; 285/371, 373, 398, 419; 156/171, 172, 173, 175

[56] References Cited

U.S. PATENT DOCUMENTS

| | | | |
|---|---|---|---|
| 3,002,534 | 10/1961 | Noland | 156/172 |
| 3,156,489 | 11/1964 | Deringer | 138/174 |
| 3,352,577 | 11/1967 | Medneg | 285/423 |
| 3,407,101 | 10/1968 | Lockshaw | 156/175 |
| 3,631,897 | 1/1972 | Fischer et al. | 138/172 |
| 3,784,441 | 1/1974 | Kaempen | 428/112 |
| 3,813,098 | 5/1974 | Fischer et al. | 156/172 |
| 4,138,285 | 2/1979 | Michael | 428/377 |
| 4,274,665 | 6/1981 | Marsh, Jr. | 285/398 |
| 4,284,298 | 8/1981 | Kaufmann, Jr. | 285/373 |

*Primary Examiner*—William R. Dixon, Jr.
*Attorney, Agent, or Firm*—Phillips, Moore, Lempio & Finley

[57] ABSTRACT

A multiple laminate comprises at least one laminate which is tapered at one or both ends to provide a laminate joint structure having a coupling tensile strength greater than the laminate interlaminar shear strength. The laminate joint structure contains at least one tapered laminate ply support structure containing continuous filament strands oriented parallel to the coupling load direction. The tubular laminate form of the tapered end laminate joint structure finds particular application to mechanically joined structures such as pipe and trusses.

The method and apparatus for making the laminate in the form of a desired composite structure comprises winding a first ply of circumferentially oriented continuous filament strands upon a mandrel and forming the ends of the first ply to have sufficient thickness to provide an inwardly tapered conical shaped exterior surface. A second ply containing continuous filament strands oriented parallel to the axis of the cylindrical forming structure is placed upon the first ply surface to form the ends of the second ply laminate into a tapard outward flaring conical configuration. A third ply of continuous filament strands is circumferentially wound upon the second ply strands to tension and secure the second ply filament strands and form at each end a flanged configuration suitable for mechanically connecting the laminate to other structures. The filament strands of each laminate ply are thoroughly impregnated with a liquid matrix which subsequently hardens to bond and maintain the filament reinforcements in the desired laminate configuration.

4 Claims, 6 Drawing Figures

COMPOSITE LAMINATE JOINT STRUCTURE AND METHOD AND APPARATUS FOR MAKING SAME

DESCRIPTION

Technical Field

This invention relates generally to a composite laminate joint structure, including a method and apparatus for making same, and more particularly to a multiple ply composite structure containing a sandwiched ply of longitudinally oriented bundles of continuous filament strands which are tapered at an angle between 5 and 15 degrees at one or both ends of the structure to enable the across-strand shear strength of each longitudinally-oriented filament ply bundle to be increased so it equals the tensile strength of the filament bundle. Composite laminate joint structures made in accordance with the specifications taught in this invention will exhibit a joint tensile strength that is governed primarily by the tensile strength of the laminate longitudinally directed filaments rather than by the interlaminar shear strength of the laminate matrix material.

BACKGROUND OF THE INVENTION

This invention relates to an oriented fiber composite structure adapted for use in a wide variety of sealing and load transfer applications and to a method and apparatus for making same. A material having two or more distinct constituent materials is a composite material. Composite materials consist of one or more discontinuous phases embedded in a continuous phase. The discontinuous phase is usually harder and stronger than the continuous phase and is called the REINFORCEMENT, whereas the continuous phase is termed the MATRIX. A composite material is produced when the volume fraction of the reinforcement exceeds ten percent and when the property of one constituent is at least five times greater than that of the other. Composite materials characteristically exhibit significant property changes as a result of the combination of reinforcement and matrix materials.

Fiber Reinforced Plastic (FRP) composite structures belong to one of two categories, depending upon whether or not the fiber reinforcement constituents are tensioned during fabrication of the composite structure. One category to which FRP composite structures belong is referred to as the Loose Fiber Reinforced Plastic (LFRP) category. The LFRP composites include those fabricated from chopped strand fibers, random oriented fiber mat, surfacing veil, felt-like fabrics, milled fibers or woven cloth. The other category is referred to as the Tensioned Filament Reinforced Plastic (TFRP) category. The TFRP composites include those fabricated from continuous unidirectional filament strands which are collimated, oriented and tensioned during the fabrication process. The TFRP composites are made by the pultrusion method, by the filament winding method, or by the combination of these two methods known as the "LONGO-CIRC" method. Pultruded TFRP composites include those containing continuous unidirectional collimated filament reinforcements which are tensioned while the filaments are pulled through extrusion dies which form the composite into structural shapes, such as angles or tees, of nearly any length. Pultruded composite structures primarily comprise tensioned "LONGOS", the name given by the American Society of Mechanical Engineers (ASME) in Section X of the Boiler and Pressure Vessel Code to longitudinally oriented filament reinforcements. Filament wound composites, on the other hand, primarily consist of tensioned "CIRCS", the ASME name given to circumferentially wound filament reinforcements. This invention includes the class of TFRP composites which contain both LONGOS and CIRCS and particularly tubular laminate structures fabricated in accordance with the "parabolic tensioning" methods taught by U.S. Pat. No. 3,784,441. The tubular laminate structures described by the specifications and illustrations of the present invention are ideally suited to serve as pipe, truss and tank structures and can resist internal pressure loads and the longitudinal and circumferential stresses which are simultaneously imposed upon the tubular laminate plies.

Prior art methods for joining tubular filament wound laminates subjected to longitudinal stresses have a joint bond strength that can never exceed the interlaminate shear strength of the plastic matrix material used to bond the laminate plies and their constituent filament reinforcements. The longitudinal loads transferred through bolted flanges, threaded ends and other prior art mechanical methods used to join and disconnect tubular laminate structures are limited by the shear strength of the adhesive material used to bond the flanges, threads or other joint making structures to the end portions of the tubular laminate. The shear strength limitations characterizing plastic matrix or bonding material, restrict, if not prevent, the use of prior art tubular laminate structures to applications where high strength mechanical joints are required. Prior art methods employed to mechanically join and seal tubular laminate structures include threaded ends and flanged ends. Threaded ends used to mechanically join and seal composite pipe of reinforced plastic are generally weaker and less wear resistant than composite flanged-ended counterparts of equivalent size and service. For this reason flanged ends are commonly employed to mechanically join and seal prior art tubular laminate structures which are highly stressed. Such flanges are frequently fabricated as separate structures which are bonded to specially prepared end portions of the composite tubes. Other flanges are filament wound or otherwise formed directly upon ends as an integral part of the composite tube structure. Prior art methods which employ these types of threaded or flanged ends to mechanically join and seal tubular laminate structures are limited by the interlaminate shear strength of the plastic matrix material used to fabricate threaded or flanged laminate structures or by the shear strength of the adhesive material used to bond prefabricated threaded or flanged structures to the ends of tubular laminate structures. For this reason prior art composite structures which mechanically join and seal tubular laminate structures possess a longitudinal tensile end-load resistance capability which is governed by flange thickness, thread root section area or the adhesive surface area employed in bonding the joint structure rather than upon the thickness of certain tubular laminate plies.

Panel laminate structures fabricated in accordance with specifications outlined in the present invention are ideally suited to serve as easily assembled integral elements of monolithic wall or roof structures. Prior art methods for joining flat or curved composite laminate panels generally involve bonding, clamping, riveting or bolting the panels. The prior art panel joining methods prevent the joint strength to equal a panel's maximum tensile and bending strength. This is because the strength of bonded or clamped joints is limited by the interlaminate shear strength of the adhesive material bonding the laminate plies. The strength of bonded and clamped joints is especially diminished when panel joints are flexed or twisted in a manner which imposes peel stresses upon the adhesive bonding material. The strength of bolted or riveted panel joints, although possibly superior to bonded joints, is limited by the tear out, bearing or crush strength of the laminate composite material. These prior art panel joining methods do not enable panel joints to be made which are flush with the joined panels.

DISCLOSURE OF THE INVENTION

A primary object of the present invention is to overcome the briefly described prior art problems and restrictions by providing a composite laminate joint structure which enables mechanically joining multiple ply composite laminates so that the joint tensile strength approximately equals the combined tensile strength of the laminate structure filament strands which are oriented parallel to the principal direction of the joint tensile stress.

Another object of this invention is to disclose how unidirectional continuous filament strands can be positioned to increase the across-strand shear strength of the individual filament strands by a factor of at least four and thereby enable a shear load applied to the unidirectional filament strands to be primarily resisted by the tensile strength of the filament strands.

The method and apparatus for making such a composite laminate joint structure may comprise the following steps:

1. Coating a cylindrical mandrel and any seal forming appurtenants with a suitable resin release agent.

2. Fabricating upon the coated mandrel and any seal forming appurtenants an impermeable inner liner structure from a combination of woven and non-woven fiber reinforcements impregnated with a resin.

3. Placing upon the liner structure a first ply of circumferentially oriented continuous filament strands which are impregnated with a liquid thermosetting polymeric resin and forming at each extremity of the first ply an inwardly tapered conical laminate support structure having sufficient thickness to provide a taper angle of at least 8 degrees.

4. Placing upon the first ply filament strands a second ply of unidirectional longitudinal continuous filament strands which are impregnated with a liquid thermosetting polymeric resin and oriented approximately parallel to the mandrel turning axis, the ends of the longitudinal filament strands being secured by a series of protruding pins or hooks which are uniformly spaced around each of the pin support rings located at the extremities of the mandrel.

5. Placing upon the second ply filament strands a third ply of circumferentially oriented continuous filament strands which are impregnated with a liquid thermosetting plastic resin and which tension and press the second ply filament strands firmly against the first ply filament strands to form at each end, against removable flange forming structures, a flanged configuration suitable for mechanically connecting the completed composite laminate joint structure to other composite laminate joint structures.

6. At least partially curing and hardening the resin to maintain all filament strands in tension and disconnecting the ends of the second ply longitudinal filament strands from pins or hooks employed to secure the ends of the second ply filament stands.

7. Fully curing and hardening the thermosetting resin matrix and removing the composite laminate joint structure from the mandrel and any seal forming appurtenants.

BRIEF DESCRIPTION OF THE DRAWINGS

Further objects of this invention will become apparent from the following description and accompanying drawings wherein.

DESCRIPTION OF THE PREFERRED EMBODIMENT

Figure 1:
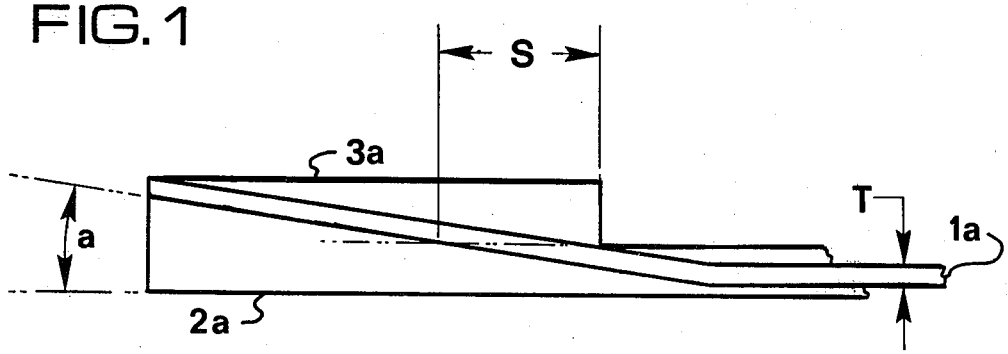
FIG. 1 displays the principal dimensional design parameters of an idealized section of an end of a composite laminate joint structure comprised of a tapered laminate ply structure sandwiched between a tapered support structure and a flanged load-inducing structure in accordance with the teaching of this invention.
Figure 2:
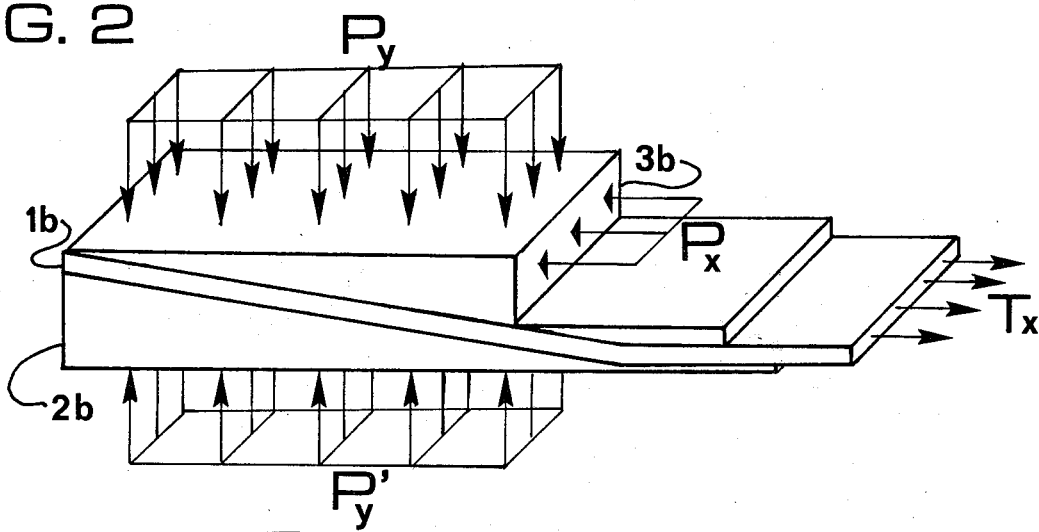
FIG. 2 is a perspective view of FIG. 1 illustrating the principal pressures and stresses imposed upon the structural constituents of a unit width of a composite laminate joint structure subjected to a representative loading condition.
Figure 3:
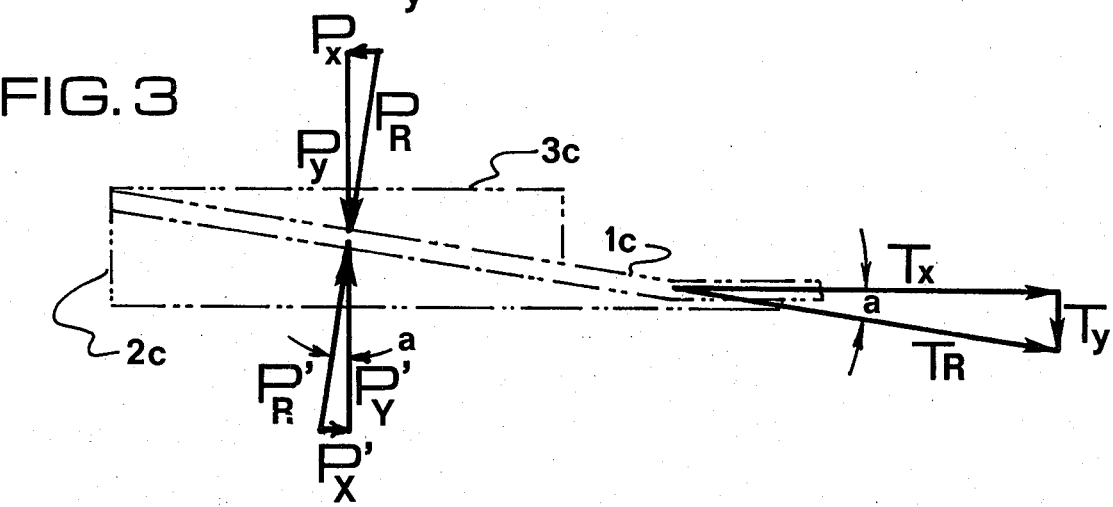
FIG. 3 schematically illustrates the relationship between the principal structural elements of the representative laminate joint structure depicted in FIG. 2 and the principal resulting load vectors.

FIGS. 1, 2 and 3 schematically illustrate the dimensional parameters and vector analyses associated with the three principal structural elements comprising an end portion of the composite laminate joint structure which represents the preferred embodiment of this invention.

The composite laminate joint structure in its broadest application comprises at least one end portion consisting of a first ply tapered support structure $2a$, having a taper angle "a" upon which is formed a tapered-end second ply structure $1a$ having a laminate thickness "T" and a taper angle "a". The second ply laminate structure comprises continuous filaments 1 which are oriented approximately parallel to the direction of the resisting tensile load vector Tx. A third ply laminate structure $3a$ is formed upon the tapered end portion of the second ply laminate and configured to form a flanged structure which communicates an impressed unit joint load Px directly to the filament reinforcements 1 comprising the tapered end portion of the second ply laminate structure $1a$.

Each filament of each strand is preferably continuous and each strand preferably contains from 204 to 12,240 (one end to 60 end) individual filaments. The filaments may be inorganically (glass, metal carbon, etc.) or organically (aramid, polyamide, fluorocarbon, etc.) composed. The preferred filament for the hereinafter described structures constitutes glass having an O.D. of 0.00095 inch or less. The preferred glass filament strand for making the hereinafter described structures has a yield of 225 to 250 yards of strand length per pound and a minimum dry breaking strength of from 190 to 250 pounds.

The hereinafter more fully described hardened "adhesive means", or "composite matrix material" used for bonding strands of superimposed laminate plies together, may be selected from the broad group of available thermosetting or thermoplastic resin materials as well as certain inorganic bonding liquids and hydraulic cements suitably composed for such bonding purposes. As is well known in the art, the thermosetting resins may be polyesters, vinylesters, furans, epoxies, phenolics, polyurethanes, silicones or any suitable mixture thereof. The thermoplastic resins may comprise polyethylene, polypropylene, aramid, or fluorocarbons. The inorganic bonding liquids may comprise the constituents of magnesium oxychloride or similar hydraulic cements. The polyesters, vinylesters and epoxies are normally utilized in the hereinafter described examples since they are relatively available, easily used and suitable for many composite structure applications.

The forming apparatus for the composite laminate joint structure is typified by a removable forming surface or mandrel which may include a pair of LONGO strand attachment rings each of which comprise an annular array of strand hooks positioned at each end of the mandrel.

The forming apparatus may also include at least one separable annular forming unit secured to the mandrel during laminate fabrication. The annular forming unit may be used to govern the end thickness and configuration of the tapered first ply support structure and to guide the fabrication of a first ply support structure having the desired angle of taper.

The preferred embodiment of this invention exhibits how the unidirectional continuous filament strands which resist an applied joint tensile load can be positioned in a composite laminate joint structure in a manner that increases the "across strand" shear path and concomitantly increases the "across strand" shear area and the net "across strand" shear strength of the continuous filament strands. The basic "across strand" shear strength of continuous filament strands can be determined by measuring the force required to punch a hardened steel die through a laminate sheet comprised of unidirectional continuous filaments bonded together with a hardened thermosetting resin and oriented in a plane perpendicular to the punch shear force direction. The basic "across strand" shear strength of the continuous filament strands equals the punch shear force divided by the product of the die punch circumference and the laminate sheet thickness. It has been determined that a shear force of approximately 6600 pounds is required to punch out a composite laminate section having a circumference of approximately 3 inches from a laminate approximately 0.10 inch thick comprised to a volume fraction of at least 45 percent of unidirectional continuous glass filament reinforcements oriented parallel to the faces of the laminate sheet and perpendicular to the die punch shear force. From such tests it has been determined that the "across strand" shear strength of continuous glass filaments is approximately one fourth the maximum tensile strength of filament strands loaded in a direction parallel to their longitudinal axis. When the "across strand" shear path of a laminate comprised of unidirectional filament strands is increased so that the shear path length equals or exceeds four times the laminate thickness the maximum shear force resisted by the filament strands is no longer governed by the combined "across strand" shear strength of the individual filament strands but is determined instead by the combined tensile strength of the individual filament strands.

FIG. 1 illustrates in cross section the arrangement and configuration of the three principal structural elements comprising an end portion of the preferred embodiment of the present invention. FIG. 1 also identifies the three dimensions which principally govern the strength per unit width of the depicted composite laminate joint structure. The first ply laminate support structure, 2a, is the principal end portion of the composite laminate joint structure and is configured to have a taper equal to the angle "a". The second ply laminate structure, 1a, has a laminate thickness "T" and a taper angle equal to that of the laminate support structure 2a. The third ply laminate structure 3a is configured to firmly contact the tapered laminate ply, 1a, and to provide a flanged joint end structure sufficiently rigid to enable the tapered laminate structure 1a to resist a unit tensile joint load along the shear plane having a shear path length equal to the "S" dimension. Table I below illustrates how the taper angle "a" governs the length of the "across strand" shear path, "S" for a given thickness, "T" of the second ply laminate structure, 1a. This relationship is expressed by the formula $S = T/\sin \text{"a"}$.

TABLE I

| TAPER ANGLE "a" (Degrees) | ACROSS STRAND SHEAR PATH LENGTH, "S" |
|---|---|
| 2 | 28.6 T |
| 5 | 11.5 T |
| 10 | 5.8 T |
| 15 | 3.9 T |
| 20 | 2.9 T |
| 30 | 2.0 T |
| 45 | 1.4 T |
| 60 | 1.2 T |

Table I illustrates that when the end portion of the second ply laminate structure, 1a, is configured to have a taper angle between 5° and 15° the "across strand" shear stress imposed upon the continuous filament strands comprising the second ply laminate structure becomes less than the tensile stress imposed upon the same strands. Tensile loads resisted by a composite laminate joint structure similar to that illustrated in FIG. 1 are thus governed by the combined tensile strength of the continuous filament strands comprising the second ply laminate structure.

FIG. 2 is an idealized perspective view of a unit width of the end portion of a composite laminate joint structure. The end portion of the laminate ply structure 1b is assumed to have a taper angle "a" greater than 5 degrees and less than 10 degrees. The unit tensile joint load, Px, which is imposed upon a unit width of the third ply flange structure 3b is resisted by an equal and opposite tensile load, Tx, imposed upon the unidirectional continuous filament strands comprising a unit width of the laminate ply structure 1b. FIG. 2 illustrates that the unit load, Px acting upon the wedge-shaped flange structure 3b requires a unit compression force equal to Py to assure the second ply laminate structure, 1b, continues to resist the unit tensile load, Tx. The unit compression force, Py, imposed upon the third ply flange structure is resisted by an equal and opposite compression force, P'y, acting upon the first ply laminate support structure, 2b.

Table II below illustrates how the magnitude of the compression force, Py, decreases with respect to a given tensile force Px, as the taper angle "a" increases. This relationship is expressed by the formula $Py = Px/\tan\,"a"$.

TABLE II

| TAPER ANGLE "a" (Degrees) | COMPRESSION FORCE, "Py" |
|---|---|
| 5 | 11.4 Px |
| 10 | 5.7 Px |
| 15 | 3.7 Px |
| 30 | 1.7 Px |
| 45 | 1.0 Px |
| 60 | 0.6 Px |

FIG. 3 is a schematic diagram of vectors imposed upon the three principal structural elements comprising the composite laminate joint structure configured to represent a preferred embodiment of the present invention. Table III below illustrates how an increase in the taper angle "a" serves to increase the resultant tensile stress, $T_R$. It should be noted that the tensile strength of the composite laminate joint structure of the present invention is governed by the unit resultant tensile force, $T_R$, imposed upon the continuous filament strands comprising the tapered end portion of the laminate structure 1c. As may be noted, for low taper angles $T_R$ approximately equals Tx. This relationship is expressed by the formula $TR = Tx/\cos\,"a"$.

TABLE III

| TAPER ANGLE "a" (Degrees) | RESULTANT TENSILE STRESS $T_R$ |
|---|---|
| 5 | 1.00 Tx |
| 10 | 1.02 Tx |
| 15 | 1.04 Tx |
| 30 | 1.15 Tx |
| 45 | 1.41 Tx |
| 60 | 2.00 Tx |

EXAMPLE 1

Figure 4:
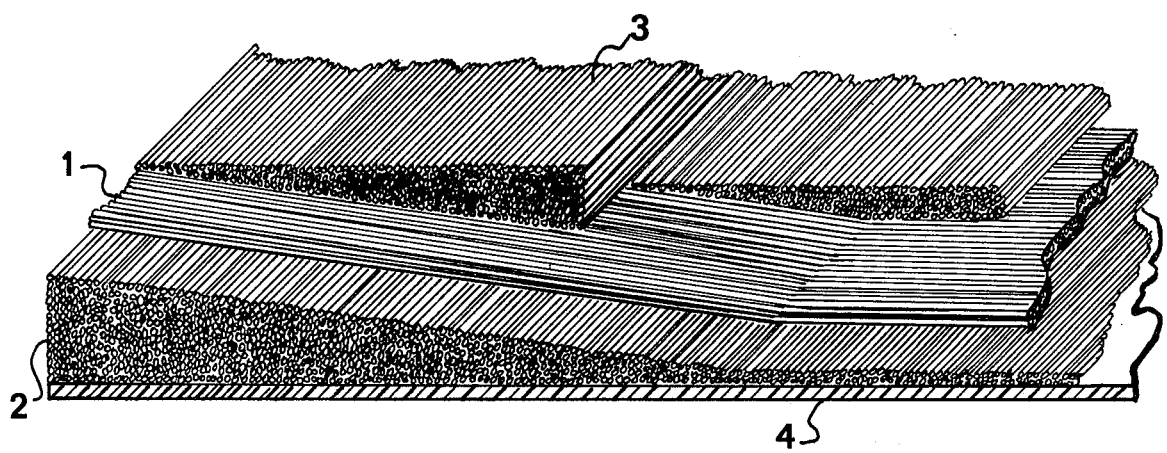
FIG. 4 is an enlarged fragmentary perspective view depicting the arrangement of filament reinforcements in the laminate plies which comprise an end portion of a composite laminate joint structure made in accordance with the teaching of this invention.

FIG. 4 depicts the end portion of a multiple ply composite laminate joint structure comprising a first ply of tensioned and compacted unidirectional continuous first filament strands 2 disposed upon an impermeable plastic liner and collimated to have a direction approximately parallel to the laminate joint end terminator and the joint flange face configured by filament strands 3 and arranged to form at the joint end a tapered second ply support surface having an angle of taper approximately equal to 8°. A second ply of tensioned and compacted unidirectional continuous second filament strands 1 having a uniform thickness was disposed transversely of and superimposed upon the first filament strands to form the tapered-end second ply support surface. A third ply of tensioned and compacted unidirectional continuous third filament strands 3 disposed transversely of and superimposed upon the second filament strands was configured to have a joint flange on the tapered end of said second ply and a joint flange face parallel to the terminator of the composite laminate joint structure.

The impermeable plastic liner was made of a thermosetting vinylester resin reinforced with a non-woven fabric comprised of glass fiber. The continuous filament strands comprising the first, second and third laminate plies consisted of glass roving strands each of which has a "yield" of 225 yards per pound, a dry strand breaking strength in excess of 200 pounds, a strand filament count of 2000 having individual filament diameters ranging from 0.00090 to 0.00095 inch. The resin matrix material used to impregnate the continuous filament strands was a liquid thermosetting polyester resin. The total thickness of the non-tapered portion of the exampled multiple ply composite structure depicted in FIG. 4 was approximately 0.34 inch in which the plastic liner was approximately 0.09 inch, the first ply thickness was 0.06 inch, and the third ply thickness was 0.12 inch. The flanged face configured from the third ply filament strands, 3, was approximately 0.25 inches high and positioned approximately 3 inches from the tapered end terminator face of the composite laminate joint structure. The above described joint structure was able to resist an end load in excess of 7200 pounds per inch of joint structure width.

EXAMPLE 2

Figure 5:
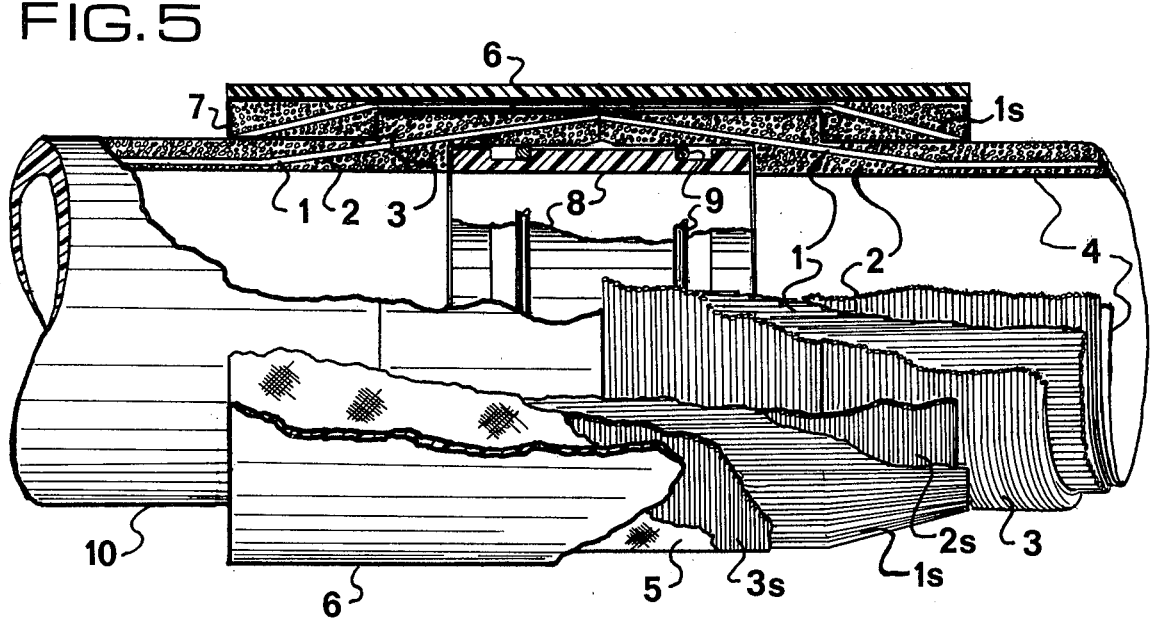
FIG. 5 is a partially sectioned side elevation view of an assembly of tubular composite laminate joint structures used in conjunction with apropriate pressure sealing and connecting structures to illustrate a pipe coupling embodiment of this invention.

FIG. 5 illustrates a partially sectioned side elevation view of an assembly of tubular composite laminate joint structures used to mechanically join and seal pressure pipe which was tested to demonstrate that the pipe and coupling meets or exceeds: (a) the performance requirements for water pipe established by American Water Works Association (AWWA) and the American National Standards Institute (ANSI) in the AWWA Standard ANSI/AWWA c950-81, (b) the specification requirements for line pipe, casing and tubing established by American Petroleum Institute in API Spec 5LR and API Spec 5Ar, and (c) the design and test criteria for pressure piping established by the American Society of Mechanical Engineers in ASME Code B31.3 and B31.4.

The pressure pipe joint detail depicted in FIG. 5 depicts a means of connecting two lengths of filament wound composite Reinforced Thermosetting Resin Pipe (RTRP), each length of which have identical pipe joint ends 10, sealed by a pair of rubber "O" rings 9 positioned on a 4 inch long reinforced plastic tubular seal sleeve structure 8 having a wall thickness of approximately 0.31 inches and an inner diameter equal to that of the pipe joint ends 10. Each joint end of the composite filament wound pipe comprised an inner impermeable liner 4 approximately 0.1 inch thick made of a glass fiber reinforced thermosetting vinylester resin which extended the full length of the pipe and which served as the sealing surface against which each rubber "O" ring seal 9 was compressed.

A first ply of continuous CIRC filament strands 2 was filament wound upon the liner structure 4 of each pipe to a minimum wall thickness of approximately 0.06 inches and enlarged at each pipe end to provide a conical laminate ply support surface having an angle of approximately 8° with respect to the pipe longitudinal axis.

A second ply comprising continuous LONGO filament strands 1 was transversely disposed upon the first ply CIRC filament strands to provide a LONGO ply laminate having a uniform thickness of approximately 0.09 inches and flared at the pipe ends at a taper angle approximately equal to that of the first ply joint structure. The "across strand" shear path of the resulting flared LONGO ply laminate was calculated to equal 0.65 inches or approximately seven times the LONGO ply laminate thickness thereby enabling a joint tensile load at least equal to 5000 pounds per inch of pipe circumference to be resisted by the continuous longitudinally directed filament strands comprising the second ply laminate.

A third ply comprising continuous CIRC filament strands 3 was filament wound upon the second ply LONGO strands to tension and compress the LONGO filament strands against the first ply tubular structure. The filament wound thickness of the third ply laminate was approximately 0.12 except for the pipe joint ends where the third ply filament strands 3 were configured to form a 3 inch wide cylindrically shaped flange having a load bearing annular plane surface extending approximately 0.25 inches above the pipe outer wall surface.

After the pipe ends were mated with the seal sleeve structure 8 the two piece segmented composite coupling structure 7 was positioned to engage and secure the abutting flanges of each pipe end. The segmented coupling structure 7 shown in FIG. 5 in a partially sectioned side elevation view comprises a first ply of continuous filament CIRC strands 2s filament wound upon a removable segmented coupling forming structure and configured at each end to have a tapered laminate support surface having a taper angle "a" of approximately 15°. A second ply of continuous filament LONGO strands 1s was then transversely disposed upon the segmented coupler first ply filament strands. A third ply of continuous filament strands 3s was afterwards filament wound upon the segmented coupler second ply LONGO strands to simultaneously tension and compress the LONGO filament strands against the segmented coupler first ply support structure. A sufficient thickness of third ply filament strands was filament wound upon the segmented coupler second ply filament strands to provide a cylindrically shaped segmented coupling structure having a uniform outer surface diameter. The outer surface of the two piece segmented coupling structure 7 was then covered with a resin impregnated woven fabric comprised of filament reinforcements to provide an improved structural integrity to the segmented coupling structure.

After the two piece coupling structure was positioned to engage the pair of pipe end flanges, a cylindrical filament wound tubular lock sleeve 6 having an inner diameter slightly larger that the outer diameter of the segmented coupling structure was slipped over the coupling halves to secure and lock the segmented coupling structure in a position that enabled the coupling structure to resist the tensile forces applied to the pipe joint structure.

EXAMPLE III

Figure 6:
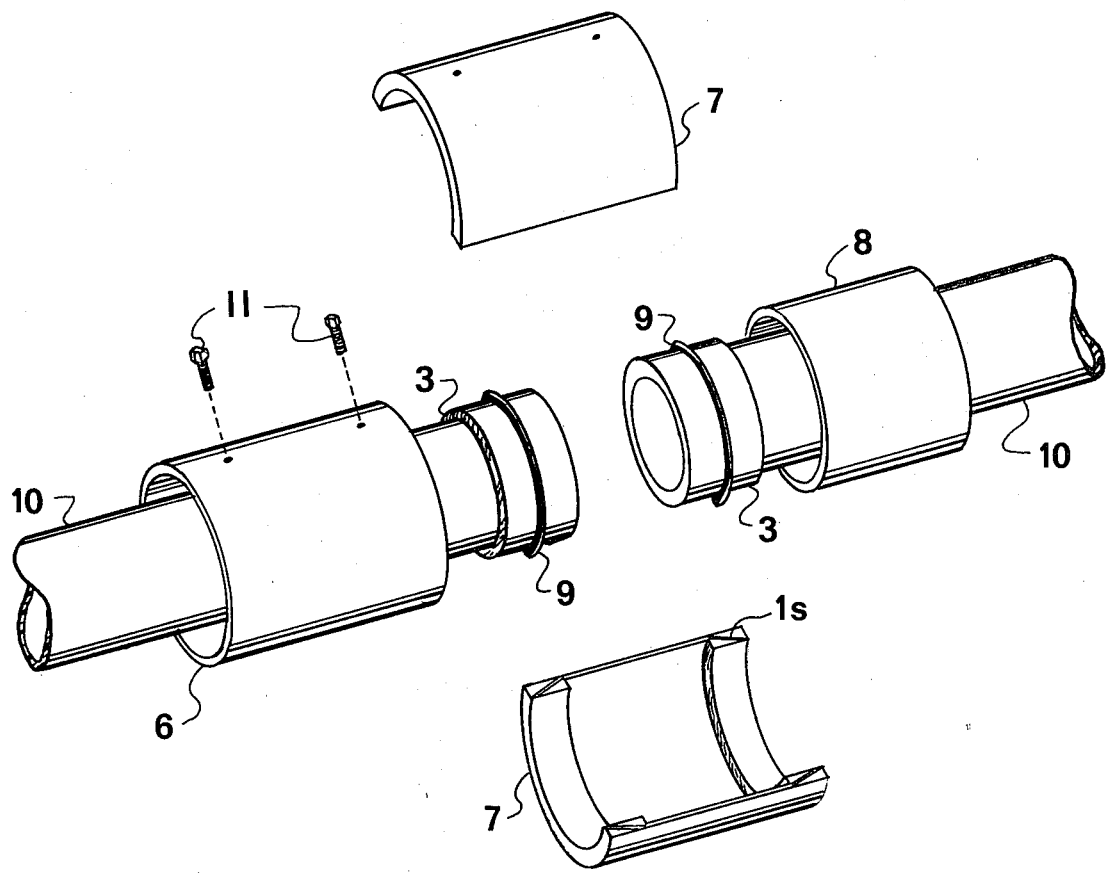
FIG. 6 is an exploded perspective view of a pipe joint embodiment of this invention employing a segmented coupling structure assembly similar to that depicted in FIG. 5.

FIG. 6 is an exploded view of a composite pipe joint and segmented coupling structure similar to that illustrated in FIG. 5 except that the exterior third ply flange structure 3 of each pipe joint end is configured to have an annular groove to retain an "O" ring seal 9 and the sealing sleeve structure 8 has an inner bore diameter designed to compress the pair of rubber "O" rings to provide a satisfactory pressure seal. Each of the tubular multiple ply composite laminate structures 10 were constructed in a manner similar to that illustrated in FIG. 4 inasmuch as the first ply laminate support structure was not recessed to accept a sealing sleeve. The two piece segmented coupling 7 illustrated in FIG. 6 is similar to that illustrated in FIG. 5 except it has a larger outer diameter to enable it to accomodate a sealing sleeve, 8, positioned upon the pipe joint flanges comprised of filament wound third ply continuous filament CIRC strands 3. The lock sleeve 6 shown in FIG. 6 was also required to have a larger diameter for a given pipe size than the lock sleeve shown in FIG. 5 and was provided with a pair of threaded lock bolts 11 to prevent the lock sleeve from being moved.

What is claimed is:

1. A composite laminate joint structure disposed on a horizontal axis thereof comprising
    a first ply of tensioned and compacted unidirectional continuous first filament strands disposed generally in a direction perpendicular to said axis, said first ply configured to have at least one end of sufficient thickness to provide an exterior surface tapered at an angle of between 5° and 15° when viewed in cross section relative to said axis,
    a second ply of tensioned and compacted unidirectional continuous second filament strands having a uniform thickness disposed transversely of and superimposed over said first ply and extending generally in the direction of said horizontal axis, said second ply having at least one end formed upon the exterior tapered surface of said first ply to provide said second ply with a taper when viewed in cross section relative to said horizontal axis,
    a third ply of tensioned and compacted unidirectional continuous third filament strands disposed transversely of and superimposed over said second ply and extending generally in a direction perpendicular to said horizontal axis, said third ply configured to have a flange on the tapered end of said second ply,
    hardened adhesive means impregnating and bonding said first, second and third plies together in a common bonding matrix to maintain them in a flanged and tapered end laminate joint configuration.

2. The invention of claim 1 wherein said composite structure is generally cylindrical and the taper angle of said first and second laminate plies is within a range of included angles of from 5° to 15°.

3. The invention of claim 2 wherein each tapered end portion of said first ply is adapted to form a cylindrical arcuate recess suitable for accepting a pressure sealing member.

4. A method for making a composite laminate joint structure along a longitudinal axis thereof comprising the steps of
    disposing a first ply of continuous first filament strands to extend in a direction substantially perpendicular to said longitudinal axis,
    collimating said first filament strands upon a removable forming surface or mandrel,
    placing said first filament strands upon said forming surface,
    applying a sufficient thickness of said first filaments at an end portion of said first ply to produce a first ply shape having a tapered end configuration, said tapered end having an angle of taper preferably ranging between 5° and 15°,
    disposing a second ply of continuous second filament strands to extend in the direction of said longitudinal axis, gripping the ends of said second filament strands by a gripping means to maintain them in a semi-taut condition, applying said second filament strands transversely across the exterior surface of said first ply, disposing a third ply of continuous third filament strands to extend in a direction substantially perpendicular to said longitudinal axis, applying said third filament strands transversely across said second filament strands to impose a substantially uniform load thereon to tension said second filament strands and press them firmly against first filament strands comprising the exterior and tapered surface of said first ply to form a third ply laminate having a tapered end configuration, positioning a removable flange forming structure at an end of said third ply, placing sufficient additional third filament strands in contact with said removable flange forming structure to configure an end of said third ply into a flange, impregnating all of said first, second and third filament strands with a liquified adhesive means, partially curing and hardening said adhesive means to maintain said first, second and third filament strands in tension, disconnecting the ends of said second filament strands from said gripping means, removing said flange forming structure, removing said forming surface or mandrel from the completed composite laminate joint structure.

* * * * *

UNITED STATES PATENT AND TRADEMARK OFFICE
CERTIFICATE OF CORRECTION

PATENT NO.   :   4,385,644
DATED        :   May 31, 1983
INVENTOR(S)  :   CHARLES E. KAEMPEN

It is certified that error appears in the above—identified patent and that said Letters Patent is hereby corrected as shown below:

On the title page, delete /73/ Assignee: Plastonics International Inc., Ohio.

Signed and Sealed this

Twenty-third Day of August 1983

[SEAL]

Attest:

GERALD J. MOSSINGHOFF

*Attesting Officer*     *Commissioner of Patents and Trademarks*